United States Patent [19]
Hughen et al.

[11] Patent Number: 5,747,192
[45] Date of Patent: May 5, 1998

[54] SINGLE PLY PSA LABELS FOR BATTERY APPLICATIONS

[75] Inventors: John F. Hughen, Rancho Cucamonga; Steven C. Kennedy, Fontana; Lon T. Spada, Walnut; Randolph W. Chan, La Cañada-Flintridge; Carol A. Koch, San Gabriel, all of Calif.

[73] Assignee: Avery Dennison Corporation, Pasadena, Calif.

[21] Appl. No.: 656,438

[22] Filed: May 31, 1996

Related U.S. Application Data

[63] Continuation of Ser. No. 480,183, Jun. 7, 1995, abandoned.

[51] Int. Cl.$^6$ .............................. H01M 2/00; B32B 1/00
[52] U.S. Cl. .............................. 429/163; 156/85
[58] Field of Search .............................. 156/84, 85, 86; 429/122, 163, 164, 175; 283/101, 107, 108, 109

[56] References Cited

U.S. PATENT DOCUMENTS

| | | | |
|---|---|---|---|
| 3,623,944 | 11/1971 | Davis | 161/242 |
| 4,592,973 | 6/1986 | Pemsler et al. | 429/206 |
| 4,608,323 | 8/1986 | Zaborney | 429/167 |
| 4,627,154 | 12/1986 | Pattison . | |
| 4,801,514 | 1/1989 | Will et al. | 429/167 |
| 4,818,588 | 4/1989 | Okabe et al. | 428/201 |
| 4,911,994 | 3/1990 | Will et al. | 429/167 |
| 5,032,477 | 7/1991 | Will et al. | 429/167 |
| 5,190,609 | 3/1993 | Lin et al. | 156/85 |
| 5,194,486 | 3/1993 | Levine et al. | 524/556 |
| 5,210,141 | 5/1993 | Yanagisawa et al. | 525/239 |
| 5,262,251 | 11/1993 | Will et al. | 429/167 |
| 5,292,566 | 3/1994 | Shacklett, III | 428/40 |
| 5,312,712 | 5/1994 | Will et al. | 429/167 |
| 5,326,654 | 7/1994 | Will et al. | 429/167 |
| 5,358,804 | 10/1994 | Will et al. | 429/167 |
| 5,443,668 | 8/1995 | Zaborney et al. | 156/86 |
| 5,604,049 | 2/1997 | Weiss et al. | 429/93 |

FOREIGN PATENT DOCUMENTS

| | | |
|---|---|---|
| 1296891 | 5/1985 | Canada . |
| 0129850 | 1/1985 | European Pat. Off. . |
| 0176704 | 4/1986 | European Pat. Off. . |
| 0388998 | 9/1990 | European Pat. Off. . |
| 0503481 | 9/1992 | European Pat. Off. . |
| 2674979 | 10/1992 | France . |
| 3322309C2 | 1/1985 | Germany . |
| 3348088C2 | 1/1985 | Germany . |
| 3430162C2 | 2/1986 | Germany . |

(List continued on next page.)

OTHER PUBLICATIONS

Zweckform Etikettiertechnik GmbH brochure, pp. 1–24 (Oct. 1989 English).

*Primary Examiner*—T. Tung
*Assistant Examiner*—Alex Noguerola
*Attorney, Agent, or Firm*—Christie, Parker & Hale, LLP

[57] ABSTRACT

There is provided a single ply label for labelling a dry cell battery having an elongate peripheral case defining an axis and opposed ends enclosing a direct current, electrical energy providing core. The label is formed of a transparent, self-supporting, substantially monoaxially oriented, heat shrinkable polymer film backing having an outer surface and an inner surface, a width sufficient for the backing to embrace the battery case and provide, at opposed ends, first and second edges which extend parallel to the axis of the battery and meet in at least abutting relationship, and a length for extending beyond the opposed ends of the battery and lap over onto the opposed third and fourth ends of the battery. An alkali-resistant, electrically non-conductive, opaque, pigmented layer is applied to the inner surface of and supported by the backing. An electrically non-conductive, pressure-sensitive adhesive layer is applied over the pigmented layer at least along the first and second edges. The pressure-sensitive adhesive has sufficient peel adhesion to prevent lifting of an applied label from the case of the battery and sufficient shear strength to prevent relative movement of adhered first edges on heat shrinkage of an adhesively applied backing about the battery case.

45 Claims, 4 Drawing Sheets

FOREIGN PATENT DOCUMENTS

| | | |
|---|---|---|
| 59-123160 | 7/1984 | Japan . |
| 59-123161 | 7/1984 | Japan . |
| 59-138052 | 8/1984 | Japan . |
| 59-144756 | 9/1984 | Japan . |
| 537319 | 3/1986 | Japan . |
| 61-138161 | 8/1986 | Japan . |
| 61-220269 | 9/1986 | Japan . |
| 62-119859 | 6/1987 | Japan . |
| 62-177864 | 8/1987 | Japan . |
| 633058 | 1/1988 | Japan . |
| 63-113488 | 5/1988 | Japan ................................. G09F 3/10 |
| 6431346 | 2/1989 | Japan . |
| 1100364 | 7/1989 | Japan . |
| 222561 | 2/1990 | Japan . |
| 5-74426 | 9/1991 | Japan ............................... H01M 2/02 |
| 5074426 | 3/1993 | Japan . |
| 757704 | 3/1995 | Japan . |
| 634581 | 1/1998 | Japan . |
| 295870 | 8/1985 | Spain . |
| 2193834 | 2/1986 | United Kingdom . |
| 2198412 | 6/1988 | United Kingdom . |

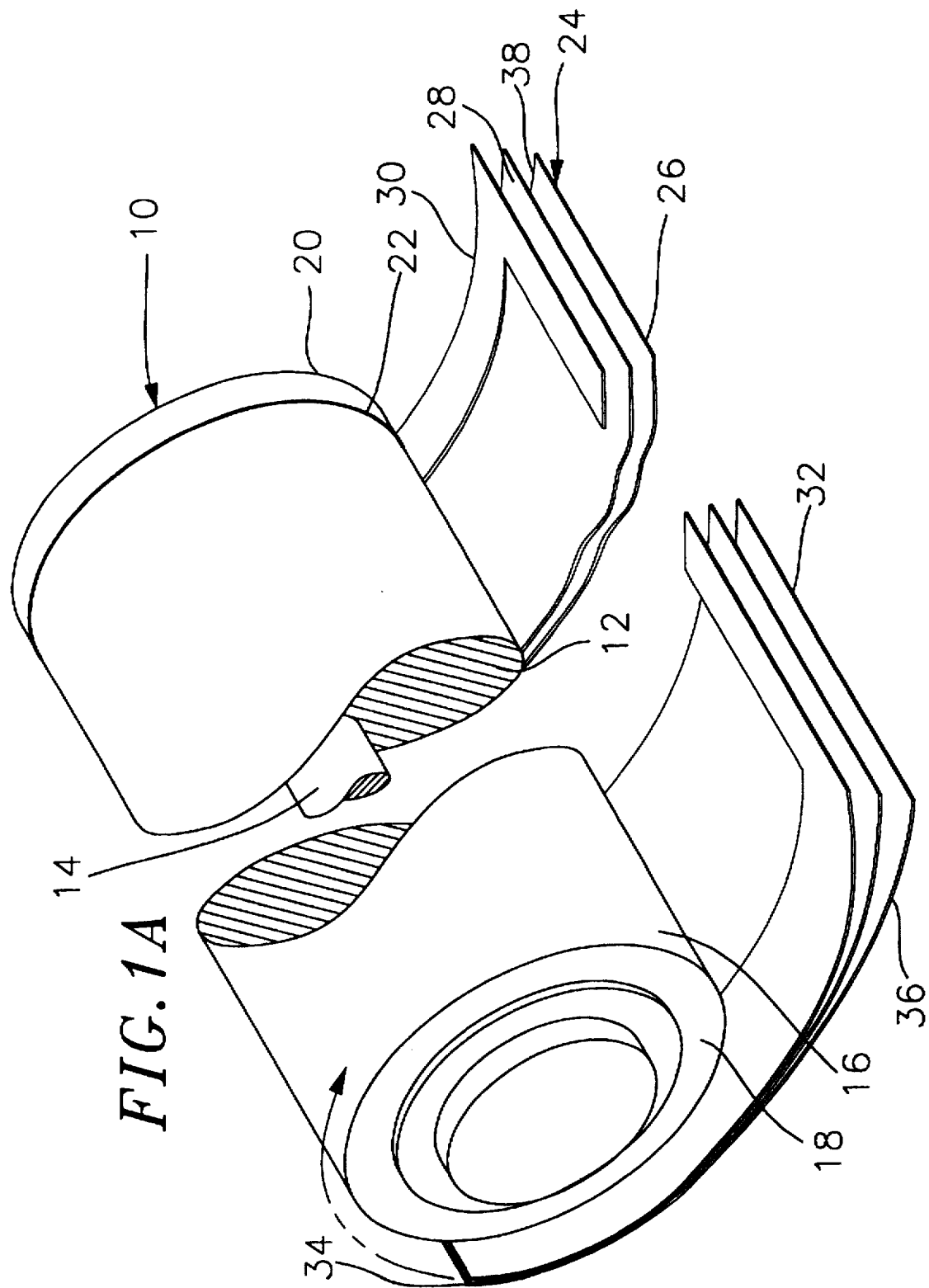

SINGLE PLY PSA LABELS FOR BATTERY APPLICATIONS

CROSS-REFERENCE TO RELATED APPLICATIONS

This is a continuation of application Ser. No. 08/480,183, filed Jun. 7, 1995, now abandoned.

BACKGROUND OF THE INVENTION

Dry cell batteries are the most popular portable sources of electrical energy. Batteries include flashlight, tool, toy, appliance batteries, and the like. Dry cell batteries come in a variety of configurations and voltage outputs and may be single or multiple use batteries. The most popular sizes are the "AA," "AAA," "C," "D" and "9 volt" batteries. The AA, AAA, C and D size batteries, along with some other configurations, utilize at least one drawn metal cylindrical casing providing and serving as the positive end pole and an end serving as the negative pole. The positive pole is separated from a negative pole by an insulator.

In early batteries, graphics used to present battery information to the consumer were applied on the battery case. Graphics were next presented on metallized paper coverings for the case of the battery. The latter has now been largely supplanted by labels which are based on the use of multiple layers or plies of polymeric shrink films, with the most popular polymeric material being polyvinyl chloride. The multilayer constructions employed have been what is termed in the art "triplex" and "duplex" constructions, with triplex being the most common.

With reference to the drawing captioned "Prior Art," the triplex construction consists of a composite laminate of a first heat shrinkable, self-supporting, polymeric film layer (2) on which there is applied a layer of a metal (4) normally formed by vapor deposition, onto which there is added a second self-supporting, heat shrinkable, polymeric film layer (2'), a graphics layer (6) and a top protective layer of another self-supporting, heat shrinkable, polymeric film layer (2"). A pressure-sensitive adhesive layer (8) is applied to the undersurface of film layer (2).

In the duplex construction, the first intermediate heat shrinkable polymer layer (2') is eliminated to provide a laminate of a first heat shrinkable polymer film layer (2) onto which there is provided a metallized layer (4), pigmented layer (6), and the heat shrinkable polymer layer (2"). The heat shrinkable polymer film layer (2) is undercoated with the pressure-sensitive adhesive layer (8). In either construction, where a bond is weak, particularly between a self-supporting, heat shrinkable polymer layer and a layer of metal, it has been common to utilize a layer of adhesive to enhance the strength of the bond. Multilayer adhesive label constructions, are described, for instance, in U.S. Pat. No. 4,801,514, 4,911,994, 5,032,477, 5,262,251 and 5,312,712, to Will et al., each incorporated herein by reference.

Attempts have been made to move the layer of metal from between layers of self-supporting heat shrinkable polymeric film to between a heat shrinkable polymer film layer and the layer of a pressure-sensitive adhesive. One such construction, not involving the use of shrink polymeric films, is described in U.S. Pat. No. 5,292,566 to Sharklett, III, incorporated herein by reference. A significant limitation of this construction, however, is that the bond of the metal to the polymeric layer is weak and the layer of metal has been susceptible to cracking by on-line impact forces used to impart lot and date code information to the label. Segments of the broken layer of metal have been known to penetrate the relatively soft pressure-sensitive adhesive layer and short circuit the battery, causing dissipation of electrical energy.

Another approach that has been commercially tried has been to substitute a UV-cured varnish for the top layer of heat shrinkable polymeric film (2"). This construction is described in U.S. Pat. No. 5,190,609 to Lee et al., incorporated herein by reference. These labels have found only limited acceptance, as the coating has proven to be a weak link exhibiting poor abrasion resistance and resistance to changes in environmental conditions.

Multiple layer constructions also present problems of matching the shrink characteristics of the several polymeric films so that no slip occurs between adjacent, heat shrinkable, polymeric film layers on heat shrinkage. If not, distortion of graphics, puckering and possible delamination can occur. The duplex construction has also exhibited problems of liftoff of the label from the battery case, as well as poor environmental aging.

It would be desirable to provide a pressure-sensitive adhesive, single ply construction for wrapping the casing of a battery. A single ply construction would be cheaper than multiple layer label constructions now employed.

To be functional, a single ply label has to have a service life in excess of 5 years without exhibiting losses due to environmental stress, including cyclic exposure to temperatures in excess of 150° F. and humidities approaching 100%. More significantly, a single ply label must properly withstand the rigors of manufacture without benefit of the presence of other plies, whose characteristics can be used to add to or modify the characteristics of a single ply to account for manufacturing and environmental stresses.

In consequence, providing an effective single ply label remains an ongoing quest in the art, despite cost and production advantages, as well as an advantage in that a single ply label construction maximizes functional battery volume by reducing the thickness of the label, thereby allowing the battery manufacturer to pack more energy into a total battery construction of fixed external dimensions.

SUMMARY OF THE INVENTION

There is provided, in accordance with the instant invention, a single ply label for dry cell batteries which provides a peripheral shell and opposed ends enclosing a direct current electrical energy-providing core. The label is formed of a transparent, self-supporting, monoaxially oriented, heat shrinkable, polymeric film facestock or backing having a width and length. The width of the backing provides at its ends first and second opposed longitudinal edges and is sufficient for the backing to embrace the case of the battery so that the first and second edges meet in at least abutting relation. The length of the backing is sufficient for the backing to extend beyond the length of the battery case and provides, at its ends, first and second opposed peripheral edges adapted, when wrapped about a battery case, to extend beyond the length of the battery case. An opaque, alkali-resistant, electrically non-conductive, pigmented layer covering any visual indicia printed on the undersurface of the backing is also printed on the undersurface of, and supported by, the backing. An electrically non-conductive pressure-sensitive adhesive layer extends at least along the length of the first and second edges of the backing, preferably about the periphery of the backing and extending sufficiently inward from the several opposed edges of the backing to ensure adhesive contact with the peripheral case of the battery at least at each opposed end of the battery. It is preferred that the pressure-sensitive adhesive extend over the entire pigmented layer. The pressure-sensitive adhesive has sufficient shear or cohesive strength to prevent heat shrinkage of the backing at least about the periphery of the battery, and a sufficient peel adhesion to prevent lifting of the label from the case of the battery along the length of the battery.

The label is applied to the outer surface of the case of the battery and attaches to the case by contact of the pressure-sensitive adhesive. The label is then wrapped around the battery case with first and second edges at least abutting third and fourth edges protruded beyond the battery case. The protruding ends of the label are caused, by action of heat on the heat shrinkable film, to shrink to wrap over the opposed ends of the battery.

The pigmented layer is, for purposes of this invention, considered to be alkali-resistant if impervious to the action of 7.2N KOH for 24 hours in an immersion test, and electrically resistant if resistance is greater than about 560 megaohms ($560 \times 10^6$ ohms).

The presently preferred adhesive is a solvent based acrylic, pressure-sensitive adhesive. Emulsion or hot melt pressure-sensitive adhesives may also be effectively employed. It is presently preferred that the pressure-sensitive adhesive provide a peel strength or peel adhesion of at least about 2 Pli (pounds per inch), preferably about 2 to about 5 Pli, a shear strength of at least 4,000 mins., preferably from about 4,000 to about 10,000 mins. and a loop tack of at least about 2 Pli, preferably about 2 to about 4 Pli The preferred backing has a coefficient of shrinkage in the peripheral or circumferential direction of up to about 60%, preferably about 20% to about 60%, more preferably about 40–50%. Shrinkage is along the width of the backing, i.e., machine direction. The presently preferred backing is a transparent, monoaxially oriented polyvinyl chloride film about 2 mils, thick.

BRIEF DESCRIPTION OF THE DRAWINGS

That portion of the drawings captioned "Prior Art" illustrates triplex and duplex label constructions which represent current adhesive battery label constructions.

FIG. 1-A shows the same construction as FIG. 1 except where the adhesive layer extends around the periphery of the label.

DETAILED DESCRIPTION

In accordance with the instant invention, there are provided single ply labels for dry cell batteries and batteries clad with such labels.

Batteries to be clad with the single ply labels of the instant invention include cylindrical "AA" "AAA" and "C" and "D" size batteries. Labels used for such batteries exceed battery length and enable label ends, when shrunk, to fold over and onto opposed ends of a battery. Labels of the instant invention may also be employed for any other dry cell battery construction which does not require the electrical considerations of cylindrical AA, AAA, C and D size batteries. Other such battery configurations include but are not limited to the popular 9-volt batteries.

Figure 1:
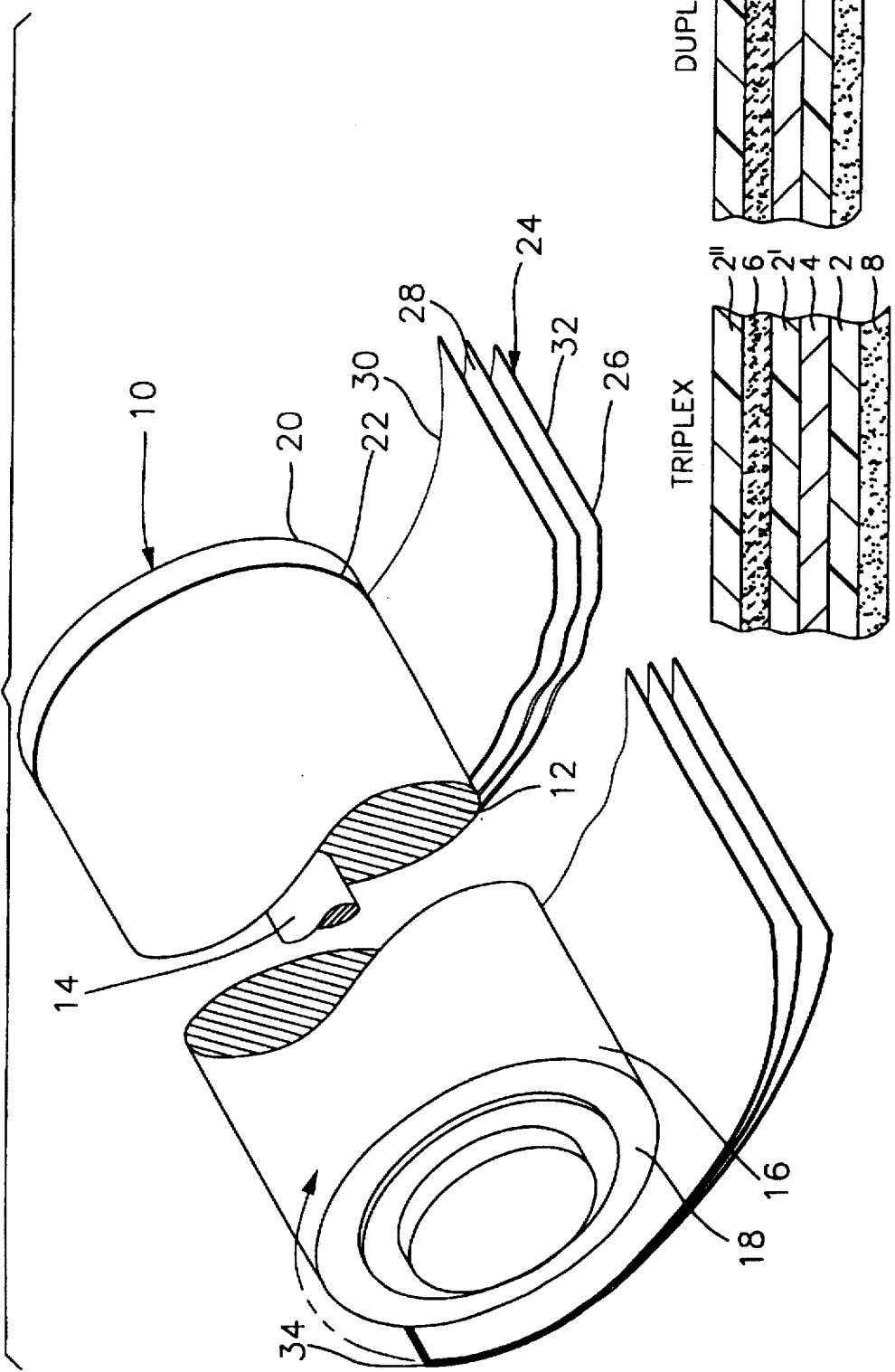
FIG. 1 illustrates a perspective view of the detail of the layers of the single ply label of the instant invention, along with the relationship of the label to the battery case.

With reference now to FIGS. 1, 1-A, 2 and 3, a typical cylindrical dry cell battery 10 consists of an electrical energy-providing core 12 preferably formed of an alkaline material and electrode 14. Both are cased by a cylindrical shell 16 providing a positive pole end cap terminal 18 and a negative pole end cap terminal 20. The positive pole is electrically connected to the core 12, and the negative pole is electrically connected to the electrode 14. Case 16 is electrically insulated from end cap 20 by an annular insulator 22 of a suitably non-conductive material. Portions of positive and negative end cap poles 18 and 20 are in contact within the single ply battery label 24 of the instant invention.

As depicted in FIG. 1 and 1-A, the single ply battery label 24 consists of three principal layers: a self-supporting, heat shrinkable layer 26; a supported alkali-resistant pigmented layer 28, which is electrically non-conductive at least in regions where it extends over battery segments 16 and 20 of the battery case; and, a supported, pressure-sensitive adhesive layer 30, which is electrically non-conductive, at least where it extends over elements 16 and 20 of the battery case. Pressure-sensitive adhesive layer 30 must extend along first and second edges 32 and 34 shown to be parallel to the axis of the battery. Edges 32 and 34 are to abut and may overlap. Adhesive is provided to ensure that some pressure-sensitive adhesive at each of the four edges contacts the battery case. Desirably, as shown in FIG. 1-A, the pressure-sensitive adhesive extends about the periphery of label 24, i.e., provides first and second edges 32 and 34 and third and fourth edges 36 and 38. More typically, as shown in FIG. 1, the pressure-sensitive adhesive layer 30 extends over the entire surface of layer 26. The pressure-sensitive adhesive layer 30 is at least electrically non-conductive where it contacts elements 18 and 20 to prevent drainage from the positive pole to the negative pole of the battery. Pigmented layer 28 and the heat shrinkable polymer facestock or backing 26 are also electrically non-conductive where they are in electrical contact with both poles of the battery 10. The non-conductive pigmented layer which eliminates prior fragile vacuum deposited metal layers is critical to the use of a single layer support.

Another key to the ability to provide a single ply battery label is the proper choice of facestock with production parameters in mind. There must be achieved with a single self-supporting layer, namely, the facestock on which the graphics are underprinted and over such underprinted graphics the adhesive is applied, a net construction which must perform as an equivalent of multiple layers which have been employed in the past. In the past, in employing multiple self-supporting layers, one layer could complement another or modify or enhance a certain property in order to tailor the label to the vigors of manufacture. In the present invention, a single layer must provide the function of multiple layers and still minimize label thickness. This cannot be achieved at the sacrifice of production. For, if going to a single layer significantly increases production cost, the increase of production cost will overcome the advantage of the single layer. In addition, the single support film must be thermally shrinkable and yet be sufficiently inelastic to withstand distortion at repeated registrations at various printing sites where a plurality of colors used to form informational as well as aesthetic graphics are printed. For such operation, some 6 to 10 or more colors will be added to a film. The film must not adversely stretch, or there will be shifts in registration impeding print clarity, which will be commercially unacceptable. At the same time, the film must have some degree of shrinkage in the machine direction to enable the ends of the applied labels to fold over the end of the battery on application of heat without distortion of the graphics on the film. If there is excessive drawback or shrinkage, the film could lift at the seams, exposing adhesive, which would be a source to collect dirt, another unacceptable result. In addition, improper shrinkage of the seams could result in lift, which leads to undesirable cosmetic appearance. With these goals in mind and the production rates of up to 800 batteries per minute for "AA" size and 600 or more batteries per minute for "AAA" batteries in labeling machines, the following specifications have been arrived at for the self-supporting layer of the label construction.

Facestock or backing 26 for the single ply construction is a monoaxially oriented polymer film, which is oriented substantially only in the direction normal to the axis of the battery, i.e. along the backing width and about its periphery. Shrinkage in that direction, i.e., in the machine direction or in the direction from first edge 32 to second edge 34 may, depending on production rate, be up to about 60%, generally from about 20 to about 60%, and preferably from about 40 to about 50%, most preferably from about 40 to about 45% for smaller batteries and 40 to 50% for larger batteries.

Residual shrink-back in storage should be not more than about 10%, preferably less than 8%, more preferably less than about 3%.

Some shrinkage may also occur in the axial direction normal thereto. Shrinkage in one direction to a direction normal thereto is from −2 to +5%, preferably 0–3%, even more preferably about 0–1%. A negative shrinkage means elongation.

The presently preferred mechanical properties of the film are tensile strength of about 15 Kpsi in the machine direction, an elongation of 77% in the machine direction, and elastic modulus of 400 Kpsi in the machine direction, all according to ASTM D882-91 (Test Method A).

A presently preferred heat shrinkable film layer 26 is preferably about 2 mils, thick and a substantially monoaxially oriented polyvinyl chloride film manufactured by American Mirrex Corp. of New Castle, Del.

Presently preferred films are machine direction monoaxially oriented polyvinyl chloride films having a thickness of from about 1 to about 3 mils, preferably from about 2 to about 3 mils, more preferably about 2 to about 2.5 mils.

In addition to polyvinyl chloride films, other heat shrinkable films which may be used as the facestock include, but are not limited to, polyvinyl fluoride films, vinylidine fluoride films, polypropylene films, and the like. Other films include polypropylene films described in U.S. Pat. No. 5,190,609 to Lee et al., incorporated herein by reference. Facestock 26 serves as the self-supported carrier for pigment layer 28 and pressure-sensitive adhesive layer 30.

Between pigment layer 28 and film 26, there are contained other intelligent indicia formed of inks, such as decorative graphics, bar codes, product information and the like. While surface conductivity and alkali resistance is not critical to such inks, they are preferably provided as inks which display resistance to attack by alkali (KOH) and preferably an electrical resistance at least equal to the electrical resistance of the pigmented layer 28 and/or pressure-sensitive adhesive layer 30. This eliminates any consideration of minor flaws providing short circuit battery drainage where the elements of the label, i.e., facestock, pigmented layer and pressure-sensitive adhesive layer, are in electrical contact with both the positive and negative polar elements of a battery.

As to any layer of the label which contacts the opposed poles of a battery, it is required that such layer be essentially non-responsive to the action of alkali or be alkali-resistant. By "alkali-resistant" there is meant the absence of any perceptible change in appearance upon exposure to 7.2N KOH for about 24 hours. Any of the elements 28 and 30 which electrically contact positive and negative battery elements must also be electrically non-conductive. By "electrically non-conductive" there is meant a resistance greater than about 560 megaohms ($560 \times 10^6$ ohms). While only components of a layer which, by necessity, bridge positive and negative poles of a battery must be electrically non-conductive, it is, as stated above, preferred that all of layers 28 and 30 be electrically non-conductive.

Pigmented layer 28 is formed of alkali-resistant inks in which the pigment is deposited from a carrier or vehicle to leave an alkali-resistant, electrically non-conductive layer which is supported by backing 26 and which provides a coating which is opaque and forms a background for a label. Single color and multicolor, side by side or overlapping pigmented layers may comprise layer 28. The indicia and background forming pigmented layer 28 are underprinted on the self-supporting, transparent layer 26.

Presently preferred alkali-resistant electrically non-conductive inks are manufactured by Zeneca Specialty Inks, Dayton, N.J. Suitable are Zeneca NDX-1467, (copper), NSX-1442 (silver), NKX-2155 (black) and NWX1596A (white). Copper and silver color inks have a pearlescent formulation, which provides a metallic appearance and replaces the conductive layer of metal found in the prior art label constructions. It is presently preferred that pigmented layer 28 be continuous over the back portion of the transparent film 26 of label 24. As indicated, however, it can be discontinuous or multilayered provided that the portion of the pigment layer 28 which is in electrical contact with the positive and negative poles 20 and 22 be electrically non-conductive in addition to being alkali-resistant.

Figure 2:
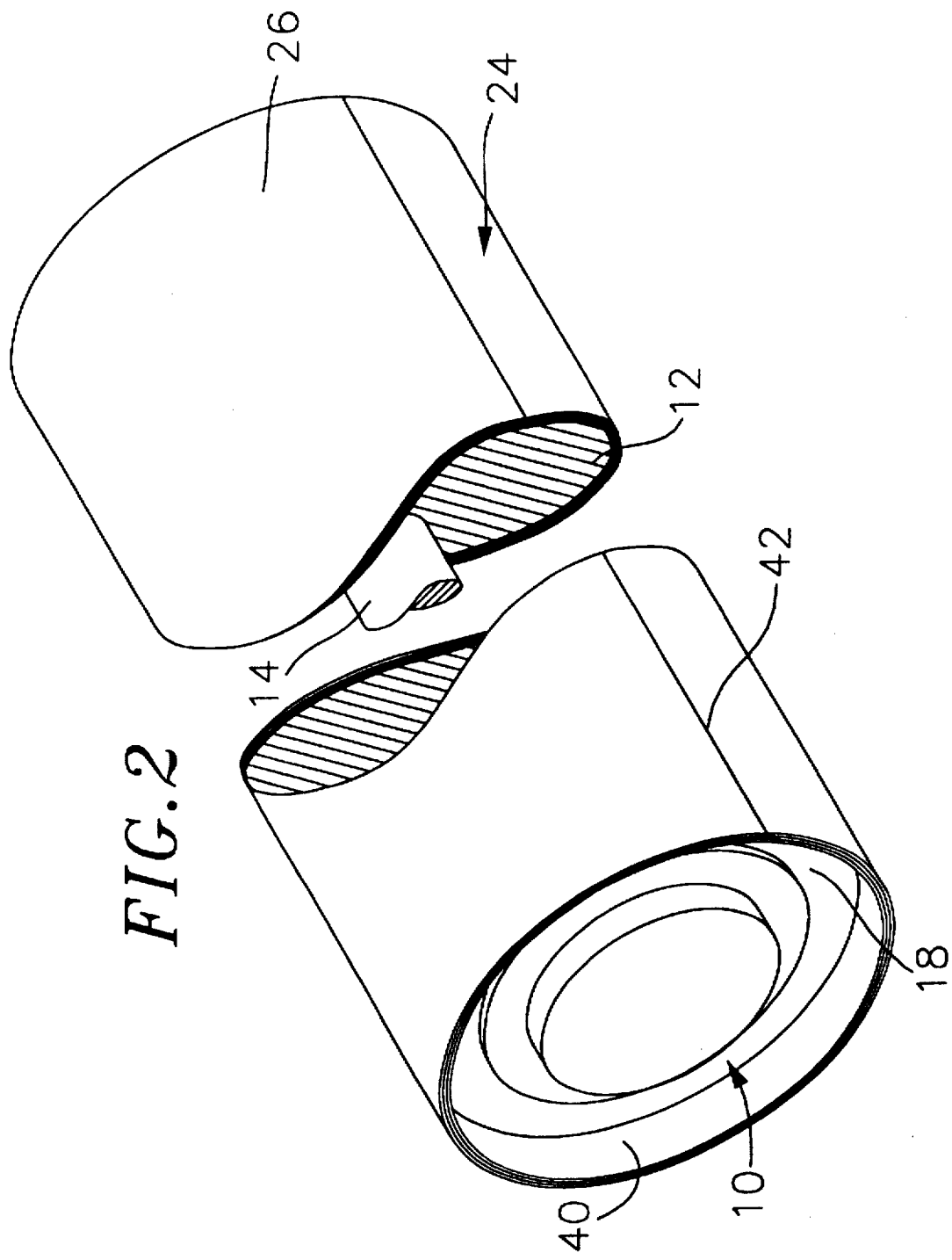
FIG. 2 shows the single ply label of the instant invention wrapped about the circumference of the battery in abutting relationship.
Figures 3, 4:
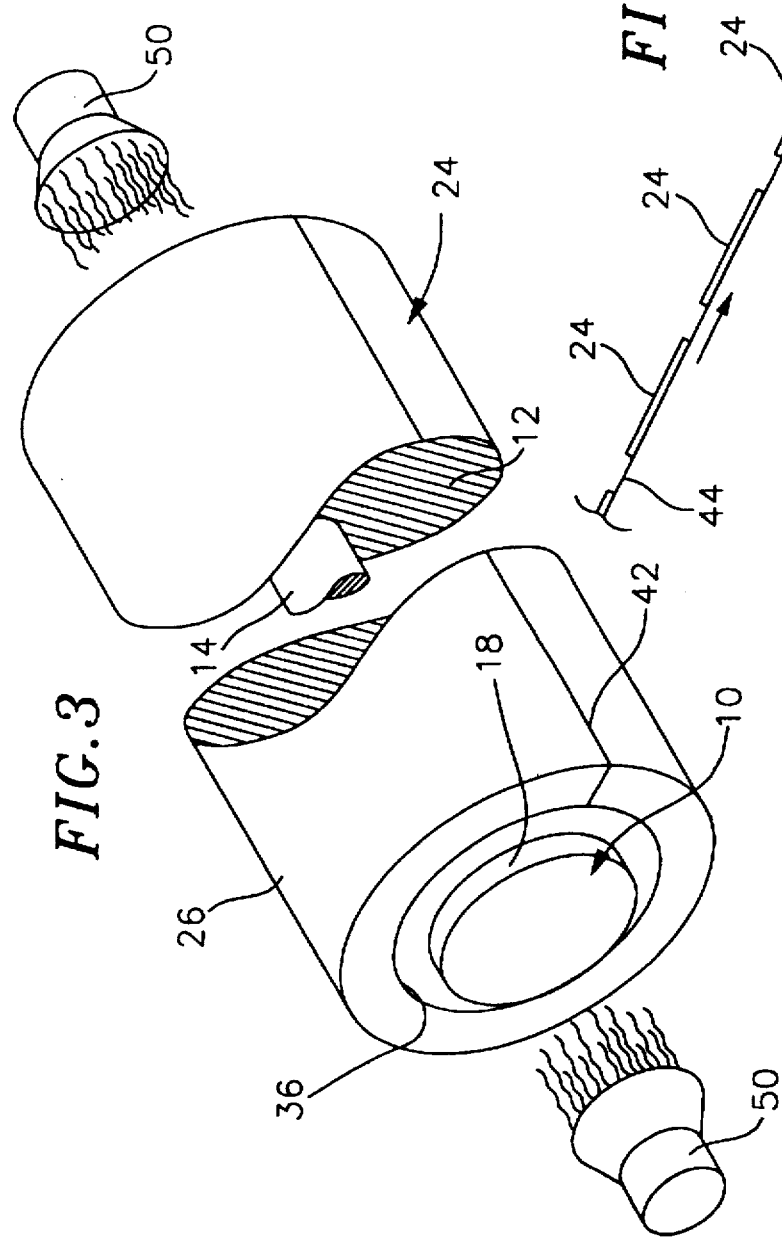
FIG. 3 illustrates heat shrinkage of protruding ends of the label over opposed ends of the battery by the application of heat.
FIG. 4 illustrates one means for labeling batteries using the single ply labels of the instant invention.

Pressure-sensitive adhesive layer 30 may, as shown in FIG. 1, extend over the entire surface of the film 28. It may also extend only along edges 32 and 34 or, as shown in FIG. 1-A, extend about the periphery of the label and be of a width sufficient to ensure contact with the case of the periphery of the battery. The adhesive bond to the battery case should be sufficient to ensure that no shrinkage of the label will occur between zones of adhesive contact except where the label extends beyond the ends of the battery. With reference to FIGS. 2 and 3, on exposure to heat, the extended ends shrink, fold over and are adhered by the pressure-sensitive adhesive to the opposed ends of the battery. In the event the pressure-sensitive layer 30 only runs along edges 32 and 34 forming seam 42, graphics must be designed to account for the manner in which layer 26 shrinks in the axial direction.

The pressure-sensitive adhesive may be applied from a solvent, emulsion or suspension, or as a hot melt. The pressure-sensitive adhesive must have sufficient shear or cohesive strength to prevent excessive shrink-back of the label where adhered to the battery case upon the action of heat after placement of the label on a battery as the substrate; sufficient peel strength to prevent the facestock from lifting from the battery, and sufficient tack or grab to enable adequate in-flight attachment of the label to the battery case during the labeling operation.

The presently preferred pressure-sensitive adhesive is a solvent-based acrylic adhesive manufactured by Ashland Chemical Company, Columbus, Ohio, under the product designation 1860Z45, modified with the addition of an antioxidant. Another suitable solvent acrylic pressure-sensitive adhesive is Polytex™ 7000 manufactured by the Avery Chemical Division of Avery Dennison Corporation and described in U.S. Pat. No. 4,812,541 to Mallya et al., incorporated herein by reference. A suitable emulsion pressure-sensitive adhesive is that described in U.S. Pat. No. 5,221,706 to Lin et al., incorporated herein by reference.

In order to have an overall balance of adhesive properties and to enable proper application and retention of the label intact on the battery case, it is presently preferred that the adhesive have a peel strength or adhesivity of at least preferably about 2 Pli, more preferably 2 to about 5 Pli, as determined by using PSTC #1 (Pressure-Sensitive Tape Counsel Test #1) run at 12 inches per minute peel rate after 20 minute dwell on a 2 mmil polyester backing; a shear strength, a measure of cohesive strength, of at least 4,000, preferably about 4,000 to about 10,000 minutes according to PSTC Test #7 using 2 mil polyester backing, which for a sample measuring 0.5 by 0.5" and a 500 gram weight, results in a loading of 2,000 grams per square inch; and a loop tack of at least about 2, preferably 2 to about 4 Pli at a 12" per minute peel rate for a 1" wide loop on stainless steel.

FIG. 4 depicts one labeling operation. With reference thereto, labels 24 on a web of release material 44 are caused to pass over a relatively sharp dispensing edge 46 and release from the web of release material 44, and adhere in flight and "grab" onto the surface of advancing battery 10. The battery 10 is rotated by roll 48 as it continues to advance, and label 24 is wrapped around the shell of the battery in abutting (FIG. 3), or slightly overlapping relation to form seam 42. The pressure-sensitive adhesive layer 30 contacts the cylindrical portion of the shell of the battery. The label is secured rigidly to the battery case and acts to resist label shrinkage about the battery case and preferably along the length and width of the battery case on application of heat from source 50, normally an air knife. The adhesive also prevents distortion of any indicia contained between layers 26 and 28 due to heat shrinkage of the facestock 26. Elimination of adhesive from along edges 36 and 38 is feasible if the backing has low shrinkage in the direction of the battery axis.

With further reference to FIGS. 2 and 3, once the label has been rolled about and adhered to the cylindrical shell of the battery 10, the ends 40 of the label extend beyond the cylindrical case of the battery 10 and protrude beyond the positive pole 18 and the negative pole (not shown) of the battery 10. As shown in FIG. 3, on application of heat, the label shrinks, causing the label end to wrap over the positive and negative poles of the battery and causing, when present, the pressure-sensitive adhesive to adhere the label to the battery case at the two ends. In the alternative, the shrinkage may be sufficient to hold the overlapping portions of the label against the surface of the ends of the battery. In the above embodiments, cohesive strength of the pressure-sensitive adhesive insures that label movement due to shrinkage along the cylindrical case does not occur and, as a consequence, distortion of the indicia cannot occur; nor, in any instance, will there form an opening at seam 42 in consequence of circumferential shrinkage. In sum, the graphics remain intact while, upon shrinkage, the exposed ends are drawn by heat shrinkage to and adhered by the pressure-sensitive adhesive to the positive and negative poles of the battery, completing, at low cost, battery labelling.

What is claimed is:

1. A single ply label for labeling a dry cell battery, said battery having an elongate peripheral case extending along the battery length and defining an axis and opposed ends intersecting the axis and enclosing, with the case, a direct current, electrical energy providing core, said label formed of:

(a) an at least partially transparent, self supporting, substantially monoaxially oriented, heat shrinkable polymer film backing having an outer surface and an inner surface for facing the battery case, a width providing at opposed ends thereof, first and second edges for extending parallel to the axis of the battery, and a length for extending beyond the opposed ends of battery and providing at opposed ends thereof, third and fourth edges for extending normal to the axis of the battery, the width of the backing being sufficient for the backing to embrace the peripheral case of the battery and for the first and second edges to meet in at least abutting relationship, and the length of the backing being sufficient for the third and fourth opposed edges to lap over the opposed ends of the battery on heat shrinkage of the backing; said backing having a heat shrinkage predomninantly in the direction of width of the backing and in an amount up to about 60% in the direction of the width of the backing;

(b) an opaque pigmented layer comprised of an alkali resistant, electrically non-conductive ink applied to at least a portion of the inner surface of and supported by the backing, said layer exhibiting no perceptible change upon exposure to the action of 7.2N KOH for 24 hours; and (c) an electrically non-conductive pressure-sensitive adhesive layer applied to and extending over the pigmented layer side of the backing at least along the first and second edges, said pressure-sensitive adhesive having a peel strength of at least about 2 Pli and sufficient shear strength to substantially prevent movement of an adhesively applied first edge of the backing to the case relative to an adhesively applied second edge of the backing on heat shrinkage of an adhesively applied backing.

2. A single ply label as claimed in claim 1 in which the backing has a shrinkage of about 40 to about 50% in the direction along the width of the backing.

3. A single ply label as claimed in claim 2 in which the backing is formed of a monoaxially oriented polyvinyl chloride film and has a thickness of about 2 to about 2.5 mils.

4. A single ply label as claimed in claim 3 in which the pressure-sensitive adhesive is an acrylic based adhesive having a peel strength of from about 2 to about 5 Pli and a shear strength of from about 4,000 to 10,000 min.

5. A single ply label as claimed in claim 4 in which the pressure-sensitive adhesive additionally extends along the third and fourth edges of the backing.

6. A single ply battery as claimed in claim 4 in which substantially all of the pigmented layer is covered with the pressure-sensitive adhesive layer.

7. A single ply label as claimed in claim 1 in which the backing has a shrinkage of about 40 to about 45% in the direction along the width of the backing.

8. A single ply label as claimed in claim 1 in which the backing is formed of a monoaxially oriented polyvinyl chloride film and has a thickness of about 1 to about 3 mils.

9. A single ply label as claimed in claim 1 in which the backing has formed of a monoaxially oriented polyvinyl chloride film and having a thickness of about 2 to about 2.5 mils.

10. A single ply label as claimed in claim 9 in which the backing is formed of a monoaxially oriented polyvinyl chloride film and has a thickness of about 1 to about 3 mils.

11. A single ply label as claimed in claim 10 in which the pressure-sensitive adhesive is an acrylic based adhesive having a peel strength of at least about 2 Pli and a shear strength of at least of about 4,000 min.

12. A single ply label as claimed in claim 1 in which the pressure-sensitive adhesive is an acrylic based adhesive having a peel strength of at least about 2 Pli and a shear strength of at least 4,000 min.

13. A single ply label as claimed in claim 1 in which the pressure-sensitive adhesive is an acrylic based adhesive having a peel strength of at least 2 to about 5 Pli and a shear strength of at least of about 4,000 to 10,000 min.

14. A single ply label as claimed in claim 1 in which the pressure-sensitive adhesive additionally extends along the third and fourth edges of the backing.

15. A single ply battery as claimed in claim 1 in which substantially all of the pigmented layer is covered with the pressure-sensitive adhesive layer.

16. A single ply label for labeling a dry cell battery, said battery having an elongate peripheral case extending along the battery length and defining an axis and opposed ends intersecting the axis and enclosing, with the case, a direct current electrical energy providing core, said label formed of:

(a) an at least partially transparent, self supporting, substantially monoaxially oriented, heat shrinkable polymer film backing having an outer surface and an inner surface for facing the battery case, a thickness of about 1 to about 3 mils, a width providing at opposed ends thereof, first and second edges for extending parallel to the axis of the battery, and a length for extending beyond the length of the battery and providing at opposed ends thereof third and fourth edges for extending normal to the axis of the battery, the width of the backing being sufficient for the backing to embrace the peripheral case of the battery and for the first and second edges to meet in at least abutting relationship about the peripheral case of the battery, and the length of the backing being sufficient for the third and fourth opposed edges to lap over the opposed ends of the battery on heat shrinkage of the backing, said backing having a heat shrink-age predominantly in the direction of the width of the backing and in an amount up to about 60% in the direction of the width of the backing;

(b) an opaque pigmented layer comprised of an alkali resistant, electrically non-conductive ink applied to at least a portion of the inner surface of and supported by the backing, said layer exhibiting no perceptible change upon exposure to the action of 7.2N KOH for 24 hours; and (c) an electrically non-conductive, acrylic based, pressure-sensitive adhesive layer extending over the pigmented layer side of the backing at least along the first and second edges and having a peel strength of at least about 2 Pli and sufficient to substantially prevent lifting of the applied label from the case of the battery and a shear strength of at least about 4,000 minutes and sufficient to substantially prevent movement of an adhesively applied first edge of the backing to the case relative to an adhesively applied second edge of the backing on heat shrinkage of an adhesively applied backing.

17. A single ply label as claimed in claim 16 in which the backing has a shrinkage about 40 to about 50% in the direction along the width of the backing.

18. A single ply label as claimed in claim 16 in which the backing is formed of a monoaxially oriented polyvinyl chloride film and has a thickness of about 2 to about 2.5 mils and a shrinkage of about 40 to 45% in the direction of the width of the backing.

19. A single ply label as claimed in claim 16 in which the pressure-sensitive adhesive has a peel strength of about 2 to about 5 Pli.

20. A single ply label as claimed in claim 16 in which the pressure-sensitive adhesive additionally extends along the third and fourth edges of the backing.

21. A single ply battery as claimed in claim 16 in which the pressure-sensitive adhesive layer covers substantially all of the pigmented layer.

22. A labeled dry-cell battery having an elongate peripheral case defining an axis and opposed ends intersecting the axis and enclosing, with the case, a direct electrical energy providing core, said label formed of:

(a) an at least partially transparent heat shrunk, self supporting, monoaxially oriented, polymer film backing having an outer surface and an inner surface facing the battery case, a width terminating in opposed first and second edges extending parallel to the axis and a length terminating in opposed third and fourth edges extending normal to the axis, said first and second edges secured by a pressure-sensitive adhesive to the case of the battery and in at least substantially abutting relationship, each of said first and second edges substantially prevented from movement relative to each other on heat shrinkage of the backing about the periphery of the battery case, said third and fourth opposed edges on heat shrinkage of the backing about the periphery of the case lapping onto and against the opposed ends of the battery, said backing having a heat shrinkage predominantly in the direction of width of the backing and in an amount up to about 60% in the direction of the width of the backing;

(b) an opaque pigmented layer comprised of an alkali resistant, electrically nonconductive ink applied to at least a portion of the inner surface of and supported by the backing, said layer exhibiting no perceptible change upon exposure to the action of 7.2N KOH for 24 hours; and (c) an electrically non-conductive pressure-sensitive adhesive layer adhering the label to the battery case and applied to and extending over the pigmented layer side of the backing at least along the first and second edges and extending sufficiently inward of the first and second edges to adhere to the battery case and having a peel adhesion of at least about 2 Pli and sufficient to prevent substantially lifting of the applied label from the case of the battery and a shear strength of at least about 4,000 minutes and sufficient to substantially prevent movement of the first edge of the backing relative to the second edge of the backing on heat shrinkage of the backing.

23. A battery as claimed in claim 22 in which the monoaxially oriented backing is, prior to shrinkage, up to about 60% shrinkable in the direction along the width of the backing.

24. A battery as claimed in claim 22 in which the monoaxially oriented backing is prior to shrinkage about 40 to about 50% shrinkable in the direction along the width of the backing.

25. A battery as claimed in claim 22 in which the backing is formed of a monoaxially oriented polyvinyl chloride film and having a thickness of about 1 to about 3 mils.

26. A battery as claimed in claim 22 in which the backing is formed of a monoaxially oriented polyvinyl chloride film having a thickness of about 2 to about 2.5 mils and a shrinkage of about 40 to about 45% in the direction along the width of the backing.

27. A battery as claimed in claim 22 in which the pressure-sensitive adhesive has a peel strength of at least about 2 Pli and a shear strength of at least about 4,000 min.

28. A battery as claimed in claim 22 in which the pressure-sensitive adhesive is an acrylic adhesive having a peel strength of at least 2 to about 5 Pli and a shear strength of about 4,000 to 10,000 min.

29. A battery as claimed in claim 28 in which the pressure-sensitive adhesive layer covers substantially all of the pigmented layer.

30. A battery as claimed in claim 22 in which the pressure-sensitive adhesive additionally extends along the third and fourth edges of the battery and at least adhesively secures said backing at said third and fourth edges to the opposed ends of the battery.

31. A battery as claimed in claim 22 in which the pressure-sensitive adhesive layer covers substantially all of the pigmented layer and in which the backing, at least at said third and fourth edges, is adhesively secured to the opposed ends of the battery.

32. A labeled dry-cell battery having an elongate peripheral case extending along the battery length and defining an axis and opposed ends intersecting the axis and enclosing, with the case, a direct current electrical energy providing core, said label formed of:

(a) an at least partially transparent, self supporting, substantially monoaxially oriented, heat shrinkable polymer film backing having an outer surface and an inner surface facing the battery case and, a thickness of about 1 to about 3 mils, a width, terminating at opposed ends in first and second edges extending parallel to the axis of the battery, and a length terminating at opposed ends, in third and fourth edges normal to the axis of the battery, said backing embracing the peripheral case of the battery with the first and second edges communicating in at least abutting relationship and adhered by a pressure-sensitive adhesive to the case of the battery, the third and fourth opposed edges overlapped onto and heat shrunk against the opposed ends of the battery, said backing having a heat shrinkage predominantly in the direction of width of the backing and in an amount up to about 60% in the direction of the width of the backing;

(b) an opaque pigmented layer comprised of an alkali resistant, electrically nonconductive ink applied to at least a portion of the inner surface of and supported by the backing, said layer exhibiting no perceptible change upon exposure to the action of 7.2N KOH for 24 hours; and (c) an electrically non-conductive, acrylic based, pressure-sensitive adhesive layer adhering the label to the battery case and extending over the pigmented layer side of the backing at least along the first and second edges sufficient to enable adhering the label at least at about the first and second edges to the case of the battery, said pressure-sensitive adhesive having a peel strength of at least about 2 Pli and a shear strength of at least about 4,000 minutes.

33. A battery as claimed in claim 32 in which the monoaxially oriented backing is, prior to shrinkage, about 40 to about 50% shrinkable in the direction along the width of the backing.

34. A battery as claimed in claim 32 in which the monoaxially oriented backing is prior to shrinkage about 40 to about 45% shrinkable in the direction along the width of the backing.

35. A battery as claimed in claim 34 in which the backing is formed of a monoaxially oriented polyvinyl chloride film that has a thickness of about 2 to about 2.5 mils.

36. A battery as claimed in claim 32 in which the pressure-sensitive adhesive is an acrylic adhesive having a peel strength of at least 2 to about 5 Pli and a shear strength of about 4,000 to 10,000 min.

37. A battery as claimed in claim 32 in which the pressure-sensitive adhesive additionally extends along the third and fourth edges of the battery and at least adhesively secures said backing at said third and fourth edges to the opposed ends of the battery.

38. A battery as claimed in claim 32 in which the pressure-sensitive adhesive layer covers substantially all of the pigmented layer.

39. A single ply label for labeling a dry cell battery, said battery having an elongate peripheral case extending along the battery length and defining an axis and opposed ends intersecting the axis and enclosing, with the case, a direct current, electrical energy providing core, said label formed of:

(a) an at least partially transparent, self supporting, substantially monoaxially oriented, heat shrinkable polymer film backing having an outer surface and an inner surface for facing the battery case, a width, providing at opposed ends thereof, first and second edges for extending parallel to the axis of the battery, and a length for extending beyond the opposed ends of battery and providing at opposed ends thereof, third and fourth edges for extending normal to the axis of the battery, the width of the backing being sufficient for the backing to embrace the peripheral case of the battery and for the first and second edges to meet in at least abutting relationship, and the length of the backing being sufficient for the third and fourth opposed edges to lap over the opposed ends of the battery on heat shrinkage of the backing; said backing having a heat shrinkage predominantly in the direction of the width of backing and in an amount up to about 60% along the width of the backing;

(b) an opaque pigmented layer comprised of an alkali resistant, electrically non-conductive ink applied to at least a portion of the inner surface of and supported by the backing, said layer exhibiting no perceptible change upon exposure to the action of 7.2N KOH for 24 hours; and (c) an electrically non-conductive pressure-sensitive adhesive layer applied to and extending over the pigmented layer side of the backing at least along the fast and second edges, said pressure-sensitive adhesive having sufficient peel strength to substantially prevent lifting of an applied label from the case of the battery and a shear strength of at least about 4,000 minutes.

40. A single ply label for labeling a dry cell battery, said battery having an elongate peripheral case extending along the battery length and defining an axis and opposed ends intersecting the axis and enclosing, with the case, a direct current, electrical energy providing core, said label formed of:

(a) an at least partially transparent, self supporting, substantially monoaxially oriented, heat shrinkable polymer film backing having an outer surface and an inner surface for facing the battery case, a width, providing at opposed ends thereof, first and second edges for extending parallel to the axis of the battery, and a length for extending beyond the opposed ends of battery and providing at opposed ends thereof third and fourth edges for extending normal to the axis of the battery, the width of the backing being sufficient for the backing to embrace the peripheral case of the battery and for the first and second edges to meet in at least abutting relationship, and the length of the backing being sufficient for the third and fourth opposed edges to lap over the opposed ends of the battery on heat shrinkage of the backing; said backing having a heat shrinkage predominantly in the direction of the width of the backing and up to about 60% along the width of the backing;

(b) an opaque pigmented layer comprised of an alkali resistant, electrically non-conductive ink applied to at least a portion of the inner surface of and supported by the backing, said layer exhibiting no perceptible change upon exposure to the action of 7.2N KOH for 24 hours; and (c) an electrically non-conductive pressure-sensitive adhesive layer extending over the pigmented layer side of the backing at least along the first and second edges and having a peel strength of at least about 2 lb./in. and sufficient to substantially prevent lifting of the applied label from the case of the battery and a shear strength of at least about 4,000 minutes and sufficient to substantially prevent movement of an adhesively applied first edge of the backing to the case relative to an adhesively applied second edge of the backing on heat shrinkage of an adhesively applied backing.

41. A single ply label for labeling a dry cell battery, said battery having an elongate peripheral case extending along the battery length and defining an axis and opposed ends intersecting the axis and enclosing, with the case, a direct current electrical energy providing core, said label formed of:

(a) an at least partially transparent self supporting, substantially monoaxially oriented, heat shrinkable polyvinyl chloride film backing having an outer surface and an inner surface for facing the battery case, a thickness of about 1 to about 3 mils, a width providing at opposed ends thereof, first and second edges for extending parallel to the axis of the battery, and a length for extending beyond the length of the battery and providing at opposed ends thereof third and fourth edges for extending normal to the axis of the battery, the width of the backing being sufficient for the backing to embrace the peripheral shell of the battery and for the first and second edges to meet in at least abutting relationship about the peripheral case of the battery, and the length of the backing being sufficient for the third and fourth opposed edges to lap over the opposed ends of the battery on heat shrinkage of the backing, said backing having a heat shrinkage predominantly in the direction of the width of the backing and up to about 45% in the direction of the width of the backing;

(b) an opaque pigmented layer comprised of an alkali resistant, electrically nonconductive ink applied to at least a portion of the inner surface of and supported by the backing, said opaque pigmented layer appearing at least in part through said backing exhibiting no perceptible change upon exposure to the action of 7.2N KOH for 24 hours; and (c) an electrically non-conductive, acrylic based, pressure-sensitive adhesive layer substantially extending over the pigmented layer side of the backing extending from the first to the second edges and from the third to the fourth edges of the pigment layer and facestock and having a peel strength of at least about 2 Pli and a shear strength of at least about 4,000 minutes and a loop tack of at least about 2 Pli at a 12-inch-per-minute peel rate for a 1-inch loop on stainless steel.

42. A labelled dry-cell battery having an elongate peripheral case extending along the battery length and defining an axis and opposed ends intersecting the axis and enclosing, with the case, a direct current electrical energy providing core, said label formed of:

(a) a self supporting, substantially monoaxially oriented, heat shrinkable polyvinyl chloride film backing having an outer surface and an inner surface facing the battery case and an outer surface, a thickness of about 1 to about 3 mils, a width, terminating at opposed ends, in first and second edges extending parallel to the axis, and a length terminating at opposed ends, in third and fourth edges normal to the axis of the battery, said label embracing the peripheral case of the battery with the first and second edges meeting in at least abutting relationship and adhered by a pressure-sensitive adhesive to the case of the battery, the third and fourth opposed edges overlapping onto and heat shrunk against the opposed ends of the battery, said backing having a heat shrinkage predominantly in the direction of width of the backing and in an amount up to about 45% in the direction of the width of the backing;

(b) an opaque pigmented layer comprised of an alkali resistant, electrically non-conductive ink applied to the inner surface of and supported by the backing and appearing at least in part through the backing, said layer exhibiting no perceptible change upon exposure to the action of 7.2N KOH for 24 hours; and (c) an electrically non-conductive, acrylic based, pressure-sensitive adhesive layer adhering the label to the battery case and substantially extending over the pigmented layer side of the backup at least from the first to the second edges and from the third to the fourth edges sufficient to enable adhering the label at about the first and second edges to the case of the battery, said pressure-sensitive adhesive having a peel strength of at least about 2 Pli and sufficient to substantially prevent lifting of the applied label from the case of the battery and a shear strength of at least about 4,000 minutes, and sufficient to substantially prevent movement of the first edge of the backing relative to the second edge of the backing on heat shrinkage of the backing.

43. A labeled dry-cell battery having an elongate peripheral case defining an axis and opposed ends intersecting the axis and enclosing, with the case, a direct electrical energy providing core, said label formed of:

(a) an at least partially transparent heat shrunk, self supporting, monoaxially oriented, polymer film backing having an outer surface and an inner surface facing the battery case, a width terminating in opposed first and second edges extending parallel to the axis and a length terminating in opposed third and fourth edges extending normal to the axis, said first and second edges secured by a pressure-sensitive adhesive to the case of the battery and in at least substantially abutting relationship, each of said first and second edges substantially prevented from movement relative to the other on beat shrinkage of the backing about the battery case, said third and fourth opposed edges lapping onto and heat shrunk against the opposed ends of the battery said backing having a heat shrinkage predominantly in the direction of the width of the backing and in an amount up to about 60% in the direction of the width of the backing prior to heat shrinkage;

(b) an opaque pigmented layer comprised of an alkali resistant, electrically nonconductive ink applied to at least a portion of the inner surface of and supported by the backing, said layer exhibiting no perceptible change upon exposure to the action of 7.2N KOH for 24 hours; and (c) an electrically non-conductive, acrylic based, pressure-sensitive adhesive layer extending over he pigmented layer side of the backing at least along the first and second edges and having a peel strength sufficient to substantially prevent lifting of the applied label from the case of the battery and a shear strength of at least about 4,000 minutes.

44. A labeled dry-cell battery having an elongate peripheral case defining an axis and opposed ends intersecting the axis and enclosing, with the case, a direct electrical energy providing core, said label formed of:

(a) an at least partially transparent heat shrunk, self supporting, monoaxially oriented, polymer firm backing having an outer surface and an inner surface facing the battery case, a width terminating in opposed first and second edges extending parallel to the axis and a length terminating in opposed third and fourth edges extending normal to the axis, said first and second edges secured by a pressure-sensitive adhesive to the case of the battery and in at least substantially abutting relationship, each of said first and second edges substantially prevented from movement relative to the other on heat shrinkage of the backing about the battery case, said third and fourth opposed edges lapping onto and heat shrunk against the opposed ends of the battery said backing having a heat shrinkage predominantly in the direction of the width of the backing and up to about 60% in the direction of the width of the backing prior to heat shrinkage;

(b) an opaque pigmented layer comprised of an alkali resistant, electrically nonconductive ink applied to at least a portion of the inner surface of and supported by the backing, said layer exhibiting no perceptible charge upon exposure to the action of 7.2N KOH for 24 hours; and (c) an electrically non-conductive pressure-sensitive adhesive layer adhering the label to the battery case and applied to and extending over the pigmented layer side of the backing at least along the first and second edges and extending sufficiently inward of the first and second edges to adhere to the battery case and having a peel strength of at least about 2 Pli and a shear strength of at least about 4,000 minutes.

45. A labeled dry-cell battery having an elongate peripheral case defining an axis and opposed ends intersecting the axis and enclosing, with the case, a direct electrical energy providing core, said label formed of:

(a) an at least partially transparent heat shrunk, self supporting, monoaxially oriented, polymer film backing having an outer surface and an inner surface facing the battery case, a width terminating in opposed first and second edges extending parallel to the axis and a length terminating in opposed third and fourth edges extending normal to the axis, said first and second edges secured by a pressure-sensitive adhesive to the case of the battery and in at least substantially abutting relationship, each of said first and second edges substantially prevented from movement relative to the other on heat shrinkage of the backing about the battery case, said third and fourth opposed edges lapping onto and heat shrunk against the opposed ends of the battery said backing having a heat shrinkage predominantly in the direction of the width of the backing and up to about 60% in the direction of the width of the backing prior to heat shrinkage of the backing;

(b) an opaque pigmented layer comprised of an alkali resistant, electrically non-conductive ink applied to at least a portion of the inner surface of and supported by the backing, said layer exhibiting no perceptible change upon exposure to the action of 7.2N KOH for 24 hours; and (c) an electrically non-conductive pressure-sensitive adhesive layer adhering the label to the battery case and applied to and extending over the pigmented layer side of the backing at least along the first and second edges and extending sufficiently inward of the first and second edges to adhere the label to the battery case and having a peel strength sufficient to substantially prevent lifting of the first and second edges from the case of the battery, a shear strength sufficient to substantially prevent movement of the first edge of the baking relative to the second edge of the backing on heat shrinkage of the backing and a loop tack of at least about 2 Pli at a 12-inch-per-minute peel rate for a 1-inch loop on stainless steel.

* * * * *

UNITED STATES PATENT AND TRADEMARK OFFICE
CERTIFICATE OF CORRECTION

PATENT NO. : 5,747,192
DATED : May 5, 1998
INVENTOR(S) : John F. Hughen; Steven C. Kennedy; Lon T. Spada; Randolph W. Chan; Carol A. Koch It is certified that error appears in the above-identified patent and that said Letters Patent is hereby corrected as shown below:

Column 1, line 5, Change "APPLICATIONS" to -- APPLICATION --.
Column 3, line 30, after "4 Pli" insert -- . --.
Column 5, line 43, Change "mils.thick" to -- mils thick -- .
Column 5, lines 55,56, replace "U.S. Pat. No. 5,190,609 to Lee et al."
    with -- U.S. Pat. No. 5,190,609 to Lin et al. --.
Column 7, line 11, replace "U.S. Pat. No. 5,221,706 to Lin et al."
    with -- U.S. Pat. No. 5,221,706 to Lee et al. --.
Column 7, line 18, change "2 mmil" to -- 2 mil -- .
Column 8, line 23, change "predomninantly" to -- predominantly --.
Column 8, line 65, change "has" to -- is -- .
Column 9, line 43, change "shrink-age" to -- shrinkage --.
Column 12, line 53, change "fast" to -- first --.
Column 14, line 65, change "beat" to -- heat -- .
Column 15, line 12, change "over he" to -- over the --.
Column 15, line 23, change "firm" to -- film --.
Column 15, line 44, change "charge" to -- change --.
Column 16, line 43, change "baking" to -- backing --.

Signed and Sealed this

Eighteenth Day of May, 1999

*Attest:*

Q. TODD DICKINSON

*Attesting Officer*   *Acting Commissioner of Patents and Trademarks*